United States Patent [19]

Miyoshi et al.

[11] Patent Number: 4,696,859
[45] Date of Patent: Sep. 29, 1987

[54] MAGNETIC RECORDING MEDIUM

[75] Inventors: Takahito Miyoshi; Nobuo Aoki; Takashi Yoneyama; Akira Kasuga; Toshimitu Okutu; Masaaki Fujiyama; Yasutoshi Okuzawa, all of Kanagawa, Japan

[73] Assignee: Fuji Photo Film Co., Ltd., Kanagawa, Japan

[21] Appl. No.: 834,680

[22] Filed: Feb. 28, 1986

[30] Foreign Application Priority Data

Feb. 28, 1985 [JP] Japan .................................. 60-39733

[51] Int. Cl.$^4$ ......................... G11B 5/71; G11B 5/714
[52] U.S. Cl. .................................... 428/323; 427/128; 428/694; 428/695; 428/900
[58] Field of Search ............... 428/323, 694, 695, 900; 427/128

[56] References Cited

U.S. PATENT DOCUMENTS

| | | | |
|---|---|---|---|
| 4,425,400 | 1/1984 | Yamaguchi et al. | 428/694 |
| 4,448,842 | 5/1984 | Yamaguchi et al. | 428/695 |
| 4,474,848 | 10/1984 | Yamaguchi et al. | 428/695 |
| 4,537,833 | 8/1985 | Kasuga et al. | 428/900 |
| 4,547,419 | 10/1985 | Nishimatsu et al. | 428/900 |

*Primary Examiner*—Paul J. Thibodeau
*Attorney, Agent, or Firm*—Sughrue, Mion, Zinn, Macpeak, and Seas

[57] ABSTRACT

A magnetic recording medium comprising a non-magnetic support having coated thereon a magnetic layer, the magnetic layer containing (i) ferromagnetic alloy particles having an average length in the long axis of 0.25 μm or less and (ii) fatty acid components comprising behenic acid in an amount of 20 to 75 wt%, stearic acid in an amount of 10 to 45 wt% and oleic acid in an amount of 10 to 45 wt% based on the total weight of the three fatty acids.

9 Claims, No Drawings

MAGNETIC RECORDING MEDIUM

FIELD OF THE INVNETION

The present invention relates to an improved magnetic recording medium comprising a non-magnetic support and a magnetic layer.

BACKGROUND OF THE INVENTION

In the past, a magnetic recording medium which is prepared by dispersing ferromagnetic acicular crystal particles such as $\gamma$-$Fe_2O_3$, Co-containing magnetic iron oxide or $CrO_2$ in a binder, and coating the thus obtained dispersion on a non-magnetic support to provide a magnetic layer has generally been used as a magnetic recording medium for audio recording, video recording and for computers (hereinafter, referred to as a magnetic tape).

However, with increased demand for high density recording on the magnetic recording medium, ferromagnetic alloy particles mainly composed of metal components such as iron, nickel or cobalt have been commonly used instead of the conventionally used ferromagnetic particles. Ferromagnetic alloy particles are very suitable as ferromagnetic particles for a magnetic recording medium which requires high density recording, because ferromagnetic alloy particles have high coercive force (Hc) and high residual magnetic flux density (Br).

High density recording on, particularly, video tape has been developed by shortening the recording wave lengths and by narrowing the width of the recording track. And with the increased demand for high density recording, a video tape using ferromagnetic alloy particles instead of the conventionally used ferromagnetic particles of iron oxide type has come to be used.

When ferromagnetic alloy particles are used, it is known that a higher density recording can be made and that the electromagnetic properties of the magnetic recording medium can be increased by smoothing a surface of the magnetic layer.

However, when a surface of the magnetic layer is made smooth, the friction coefficient of contact between the magnetic layer and a magnetic head increases, whereby the magnetic layer of the magnetic recording medium becomes damaged in a short time, or the magnetic layer tends to be peeled apart. In particular, a video tape is used in many cases under such harsh conditions that the tape is set at a still mode, and an increase of the friction coefficient of the magnetic layer leads to a shorter still life of the magnetic layer at a still mode. Accordingly, the running durability of the magnetic layer of a video tape has been required to be improved.

In order to improve running durability of a magnetic layer, it has been proposed in U.S. Pat. No. 3,833,412 to add abrasive agents (hard particles) such as, corundum, silicon carbide or chromium oxide, into the magnetic layer. In such a case, a relatively large amount of abrasive agents needs to be added to effectively improve running durability. However, the above method is not desirable, because a magnetic layer containing a large amount of abrasive agents causes heavy wear out of magnetic heads and makes it difficult to smooth the magnetic layer to improve electromagnetic properties. Further, it has been proposed in U.S. Pat. No. 3,687,725 to add lubricants, such as fatty acid, fatty acid ester or silicon oil, into a magnetic layer. Wear resistance can be improved by this method. However, until now, a satisfactory method which meets all requirements of high output, no decrease in output after running, and no generation of white powders which stain guide systems (hereinafter, referred to as a "guide stain"), has not yet been obtained.

SUMMARY OF THE INVENTION

An object of the present invention is to provide a magnetic recording medium having excellent electromagnetic properties, good and stable running durability for a long term, and particularly having a reduced decrease of reproduced output and a reduced adhesion of scratched powders so that the gap of a video head is not bridged by the powders scratched from a magnetic layer.

The present invention relates to a magnetic recording medium comprising a non-magnetic support having coated thereon a magnetic layer, the magnetic layer containing (i) ferromagnetic alloy particles having an average length in the long axis of 0.25 $\mu$m or less and (ii) fatty acid components comprising behenic acid in an amount of 20 to 75 wt %, stearic acid in an amount of 10 to 45 wt % and oleic acid in an amount of 10 to 45 wt % based on the total weight of the three fatty acids.

DETAILED DESCRIPTION OF THE INVENTION

The magnetic recording medium of the present invention comprises a non-magnetic support and a magnetic layer containing ferromagnetic alloy particles provided on the non-magnetic support.

Non-magnetic supports which can be used in the present invention include those that have been conventionally used, such as synthetic resin films (e.g., polyethylene terephthalate, polypropylene, polycarbonate, polyethylene naphthalate, polyamide, polyamide imide and polyimide), and a metal foil such as an aluminum foil or a stainless steel foil. The thickness of the non-magnetic support is, generally 3 to 50 $\mu$m, preferably 5 to 30 $\mu$m, and more preferably 5 to 10 $\mu$m.

A backing layer, such as described in U.S. Pat. No. 4,414,270, can be provided on the surface of the non-magnetic support which is opposite the surface on which the magnetic layer is provided.

It is necessary that the ferromagnetic alloy particles contained in the magnetic layer of the magnetic recording medium of the present invention have a specific surface area (S BET) of 45 $m^2$/g or more. Further, it has been found that the electromagnetic properties can remarkably be improved by the use of ferromagnetic alloy particles having a specific surface area of 50 $m^2$/g or more. The average length in the long axis of the particles is preferably 0.25 $\mu$m or less, and more preferably 0.20 $\mu$m or less. The axis ratio (length in the long axis/length in the short axis) is preferably 7/1 or more, more preferably 9/1 to 20/1.

The metal content of ferromagnetic alloy particles which can be used in the present invention is 75 wt % or more based on the total weight of the ferromagnetic alloy particles, and 80 wt % or more of the metal content is at least one ferromagnetic alloy component selected from Fe, Co, Ni, Fe-Co, Fe-Ni, Co-Ni, and Co-Ni-Fe and 20 wt % or less of the metal content can be other metal components (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B and P). The above ferromagnetic alloy particles may contain a small amount of water, hydroxides or oxides. The ferromagnetic alloy particles used in the present invention can be prepared in accordance with a conventional method.

Example of methods for preparing ferromagnetic alloy particles are illustrated below.

(a) Reducing a complex salt of organic acids (mainly oxalate) with a reducing gas such as hydrogen.

(b) Reducing iron oxide with a reducing gas, such as hydrogen, to obtain Fe or Fe-Co particles.

(c) Heat-decomposing a metal carbonyl compound.

(d) Adding a reducing agent such as sodium boron hydride, hypophosphite or hydrazine into an aqueous solution of ferromagnetic metal to reduce it.

(e) Precipitating ferromagnetic metal particles by electrolysis with a mercury cathode and separating particles from mercury.

(f) Evaporating metal in the presence of an inactive gas to obtain particles thereof.

The shape of the ferromagnetic alloy is not limited, but an acicular shape, a granular shape, a dice shape, a rice-grain shape or a tabular shape can generally be employed. Among these, an acicular shape can preferably be employed.

It is necessary that the magnetic layer of the magnetic recording medium of the present invention contains three fatty acids which are stearic acid, oleic acid and behenic acid. The amount of stearic acid in the magnetic layer is 10 to 45 wt %, preferably 10 to 40 wt %, more preferably 15 to 35 wt %, that of oleic acid is 10 to 45 wt %, preferably 10 to 45 wt %, more preferably 15 to 35 wt %, and that of behenic acid is 20 to 75 wt %, preferably 25 to 65 wt %, more preferably 30 to 60 wt %, based on the total weight of the three fatty acids (i.e., stearic acid, oleic acid and behenic acid) used in the present invention. The magnetic layer of the present invention can also contain one or more lubricants in the form of other fatty acids and saturated fatty acid esters. These lubricants (e.g., three fatty acid esters, other fatty acids and saturated fatty acids) are generally employed in an amount of 10 wt % or less, preferably 1 to 9 wt %, more preferably 2 to 8 wt % based on a total weight of the ferromagnetic alloy particles. The three fatty acids (i.e., stearic acid, oleic acid and beheic acid) used in the present invention are present in the magnetic layer in an amount of 20 wt % or more, preferably 30 to 90 wt % and more preferably 40 to 80 wt % based on the total weight of lubricants (e.g., three fatty acids, other fatty acids and saturated fatty acid esters).

In the present invention, by the use of ferromagnetic alloy particles having an average length in the long axis of 0.25 $\mu$m or less, and by the use of the three fatty acids, stearic acid, oleic acid and behenic acid in combination, the reproduced output can be maintained remarkably high and the running durability can be increased, since output decrease after running and guide stain hardly occur.

The effect of the present invention is largely influenced by the mixing ratio of the three fatty acids, (stearic acid, oleic acid and behenic acid). Thus, without stearic acid in the specified amount, the friction coefficient increases. Moreover, guide stain occurs if the specified amount of oleic acid is not employed. Further, output decrease occurs in the absence of the specified amount of beheic acid. But with the combined use of the three fatty acids in the specified amounts, reproduced output can be high and running durability can be improved at the same time.

It is preferred that the magnetic layer of the magnetic recording medium in the present invention contains ferromagnetic alloy particles, fatty acids and fatty acid esters and further contains abrasive agents. Abrasive agents which can be used include $Cr_2O_3$, $SiC$, $TiO_2$, $TiO$, $TiC$, $\alpha$-$Al_2O_3$ and $\alpha$-$Fe_2O_3$, which can be used alone or in combination. Among these, $\alpha$-$Al_2O_3$, $Cr_2O_3$ and $\alpha$-$Fe_2O_3$ are preferred. Further, $\alpha$-$Al_2O_3$ and $\alpha$-$Fe_2O_3$ are particularly preferred. The average particle size of the abrasive agents preferably is a size which is used commonly, and is generally 0.2 to 0.8 $\mu$m, preferably 0.2 to 0.5 $\mu$m. The abrasive agents are generally present in the magnetic layer in an amount of 15 wt % or less, preferably 1 to 10 wt % based on the weight of the ferromagnetic alloy particles.

The running durability of the magnetic recording medium can further be improved by incorporating the above abrasive agents into the magnetic layer, because the still life of the video tape becomes longer. As far as the abrasive agents are used in the amount as described above, the smoothness of the magnetic layer is not affected by the incorporation of the abrasive agents into the magnetic layer.

In order to prepare the magnetic layer, it is preferred to disperse the above described ferromagnetic alloy particles, fatty acids, fatty acid esters and abrasive agents in a binder which is described below.

The binder which is used for forming the magnetic layer of the present invention comprises one or more binder materials conventionally used as a binder for a magnetic recording medium, including thermoplastic resins, thermosetting resins, reactive resins, and mixtures thereof.

Thermoplastic resins which can be used as a binder in the present invention have an average molecular weight of 10,000 to 200,000, preferably 20,000 to 100,000, and a polymerization degree of about 200 to 2,000. Examples of such thermoplastic resins include copolymers of vinyl chloride and vinyl acetate (e.g., copolymers of vinyl chloride and vinyl acetate, copolymers of vinyl chloride, vinyl acetate and vinyl alcohol, copolymers of vinyl chloride, vinyl acetate and maleic acid), copolymers of vinyl chloride and vinylidene chloride, acrylic resins (e.g., copolymers of vinyl chloride and acrylonitrile, copolymers of vinylidene chloride and acrylonitrile, copolymers of (metha)acrylic acid ester (e.g., methacrylic acid ester or acrylic acid ester) and acrylonitrile, copolymers of (metha)acrylate (e.g., methacrylate or acrylate) and vinylidene chloride, copolymers of (metha)acrylate and styrene, copolymers of butadiene and acrylonitrile), cellulose derivatives (e.g., cellulose acetate butyrate, cellulose diacetate, cellulose triacetate, cellulose propionate, cellulose acetate propionate, nitrocellulose, cellulose acetate), various thermoplastic resins of synthetic rubbers (e.g., polybutadiene, chloroprene, polyisoprene, copolymers of styrene and butadiene), a polyurethane resin, polyvinyl fluoride, a polyamide resin, polyvinyl butyrate, copolymers of styrene and butadiene and polystyrene resin, which are used alone or in combination.

Thermosetting resins or reactive resins are those that have an average molecular weight of 200,000 or less when they are present in a coating solution and which have a molecular weight that becomes infinite through a condensation reaction or an addition reaction after coating. When these resins are hardened by heating, it is preferred that these resins are resins which are not softened nor melted, by the heating used to harden them.

Examples of these resins include phenol/formalin/-novolac resins, phenol/formalin/resol resins, phenol/-furfural resins, xylene/formalin resins, urea resins, melamine resins, dry oil modified alkyd resins, phenol resin modified alkyd resins, maleic acid resin modified alkyd resins, unsaturated polyester resins, combination of epoxy resins and hardening agents (examples of hardening agents: polyamine, acid anhydrides, polyamide resins), polyether moisture hardened resins having isocyanate groups at the terminal end, polyisocyanate prepolymer (e.g., a compound of reaction product with diisocyanate and a low molecular weight triol having at least three isocyanate groups in a molecule, trimer and tetramer of diisocyanates), resins containing polyisocyanate prepolymer and active hydrogen (e.g., polyester polyol, polyether polyol, copolymers of acrylic acid, copolymers of maleic acid, copolymers of 2-hydroxyethyl methacrylate, copolymers of p-hydroxystyrene), which can be used alone or in combination. The preferred binder is the one which is prepared by mixing copolymers of vinyl chloride and vinyl acetate with polyurethane resins and further adding cellulose derivatives thereto.

The amount of binder in the magnetic layer is generally 10 to 100 wt %, preferably 15 to 50 wt % based on the weight of the ferromagnetic alloy particles.

Granular fillers (e.g., known organic or inorganic fillers) can be incorporated into the magnetic layer of the present invention. Granular fillers which can be used in the present invention are not particularly limited, but the average particle diameter is 0.01 to 0.8 µm, preferably 0.06 to 0.4 µm. Examples of these granular fillers include graphite, tungsten disulfide, boron nitride, calcium carbonate, titanium dioxide, magnesium carbonate, zinc oxide, calcium oxide, lithopone and talc, which can be used alone or in combination.

Other than the above granular fillers, carbon black having an average particle diameter of 0.015 to 0.2 µm also can preferably be used as granular fillers.

The amount of granular fillers used is generally 0.2 to 10 wt % based on the weight of the ferromagnetic alloy particles.

A method of preparing a magnetic recording medium of the present invention is illustrated hereinafter.

To prepare a magnetic layer of a magnetic recording medium of the present invention, fatty acids, ferromagnetic alloy particles, binders, and further abrasive agents and other lubricating agents, if desired, are mixed and kneaded with solvents to prepare a magnetic coating composition.

Solvents used for mixing and kneading are those that are generally used for preparing a magnetic coating composition, such as ketones (e.g., acetone, methyl ethyl ketone, methyl isobutyl ketone, cyclohexanone, isophorone, etc.), alcohols (e.g., methanol, ethanol, propanol, butanol, isobutyl alcohol, isopropyl alcohol, methylcyclohexanol, etc.), esters (e.g., methyl acetate, ethyl acetate, butyl acetate, isobutyl acetate, isopropyl acetate, ethyl lactate, monoethyl ethyl, glycol acetate, etc.), glycol ethers (e.g., ether, glycol dimethyl ether, glycol monoethyl ether, dioxano, etc.), aromatic hydrocarbons (e.g., benzene, toluene, xylene, cresol chlorobenzene, styrene, etc.), chlorinated hydrocarbons (e.g., methylene chloride, ethylene chloride, carbon tetrachloride, chloroform, ethylene chlorohydrin, dichlorobenzene, etc.), N,N-dimethylformaldehyde, and hexane.

Mixing and kneading can be carried out in any manner, and preferred methods of adding each ingredient can easily be determined.

For preparing a magnetic coating composition, an ordinary mixing and kneading device can be used, such as a two-roll mill, a three-roll mill, a ball mill, a pebble mill, a Tron mill, a sand grinder, an atrittor, a high speed impeller dispersing device, a high speed stone mill, a high speed impact mill, a disperser, a kneader, a high speed mixer, a homogenizer or an ultrasonic dispersing device.

Detailed technology for mixing, kneading and dispersing is described in T. C. Patton, "Flow of coating materials and dispersion of pigments", published by Kyoritsu Shuppan, 1971, translated by Tadashi Ueki, and in U.S. Pat. Nos. 2,581,414 and 2,855,156. A magnetic coating composition of the present invention can be prepared in accordance with the methods as described above.

The thus prepared magnetic coating composition is coated on a non-magnetic support described hereinbefore. The coating composition can be coated on a non-magnetic support directly or can be coated through an adhesive layer.

Examples of coating methods on a non-magnetic support include an air knife coating method, a blade coating method, a rod coating method, an extrusion coating method, an air doctor coating method, a squeeze coating method, an immersion coating method, a reverse roll coating method, a transfer roll coating method, a gravure coating method, a kiss coating method, a cast coating method, a spray coating method and a spin coating method. Other coating methods also can be used in the present invention. Specific detailed explanation of these coating method is described in "Coating Kogaku" (Coating Engineering), pages 253 to 277 published by Asakura Shoten, 1971.

The dry thickness of a coated magnetic layer is generally about 0.5 to 10 µm, preferably 1.5 to 7.0 µm.

A magnetic layer thus provided on a non-magnetic support is generally subjected to magnetic orientation to orient the ferromagnetic alloy particles contained in the magnetic layer, dried and, if desired, is subjected to surface smoothing treatment. The thus smoothing-treated magnetic recording medium is slit to a desired shape. These treatments are described in U.S. Pat. No. 3,473,960.

The present invention is hereinafter illustrated in more detail by the following Examples and Comparative Examples. In the Examples and Comparative Examples, all parts are by weight.

EXAMPLE

A magnetic coating composition was prepared from a magnetic composition and a hardening agent composition having the following ingredients, and then was coated on a non-magnetic polyethylene terephthalate support having a thickness of 10 µm and dried to form a magnetic layer having a dry thickness of 3.0 µm.

| Magnetic Composition | |
|---|---|
| Ferromagnetic alloy particles (Fe—Ni alloy, Ni content: about 5 wt %) (Average length in long axis: shown in Table 1) | 100 parts |
| Copolymer of vinyl chloride, vinyl acetate and maleic acid (prepared by Nippon Zeon Co., Ltd.: 400 × 110 A) | 11 parts |

-continued

| | |
|---|---|
| Urethane resin ("N-2301", a trade name, manufactured by Nippon Polyurethane Co., Ltd.) | 12 parts |
| Carbon black (average particle diameter: 94 mμ) | 2 parts |
| Oleic acid<br>Behenic acid totally<br>Stearic acid | 2 parts |
| Butyl stearate | 1 part |
| α-Al$_2$O$_3$ (particle diameter: 0.3 to 0.5 μm) | 5 parts |
| Methyl ethyl ketone | 500 parts |
| Hardening Agent Composition | |
| Polyisocyanate ("Collonate L", a trade name, manufactured by Nippon Polyurethane Co., Ltd.) | 8 parts |
| Methyl ethyl ketone | 100 parts |

The above ingredients for the magnetic composition and the hardening agent composition were mixed and dispersed to prepare the magnetic coating composition.

The magnetic coating composition was coated on the support. The amount of three fatty acids was varied as shown in Table 1 to obtain Sample Nos. 1 to 8 in Table 1. While it was undried, the magnetic layer thus prepared was subjected to magnetic orientation (magnetic field: 2500 Gs), dried, was subjected to calendering treatment, and was slit to a width of 8 mm to prepare a 8 mm video tape.

The thus obtained video tape was placed in a 8 mm video tape recorder "Fuji×8" and then was run. The reproduced output at a recording wave length of 0.7 μm of Sample No. 5 tape was used as a standard and the reproduced output at the same recording wave length for the other sample tapes was compared with that of the Sample No. 5 tape.

For each sample tape, the reproduced output after running for 10 passes was measured by a Osilloscope and was compared with the initial reproduced output.

The friction coefficient μ and guide stain were measured after running the thus obtained video tape on the above video tape recorder for 10 times. The results are shown in Table 1.

Reproduced output:
The envelope pulse shape of samples is read off using 433-type Osilloscope manufactured by Pelctronics Co., Ltd.

μ values:
The friction coefficient (μ value) was calculated by the formula $$\mu = \frac{1}{\pi} ln \frac{T_2}{T_1},$$

wherein $T_1$ is 50 g. That is, as friction coefficient is smaller, running property is better.

Guide stain:
After running for 10 passes, the guide pole of a VHS cassette was checked for the presence of stain.

In Table 1, Sample No. 1 was prepared as an example in accordance with the present invention, and Sample Nos. 2 to 8 were prepared as Comparative Examples. As is apparent from the results of Sample Nos. 6 to 8, when one of stearic acid, behenic acid and oleic acid was missing as fatty acids, the reproduced output was low and the reproduced output after 10 passes running was also low.

As is apparent from Sample No. 8, when fatty acids containing no oleic acid were used, white powders generated around a guide pole.

As is apparent from Sample Nos. 2 to 4, when fatty acids were used in amounts outside the range of the present invention, the reproduced output after 10 passes running decreased, the initial reproduced output was low and the friction coefficient was increased.

When ferromagnetic alloy particles having an average length in long axis of 0.3 μm were used, the reproduced output was extremely low and the object of the present invention could not be achieved.

Accordingly, it is clearly seen from the above results that both the reproduced output and the running durability were improved by the use of ferromagnetic alloy particles having an average length in the long axis of 0.2 μm and by the use of the three fatty acids of stearic acid, behenic acid and oleic acid in a specific ratio, and further that guide stain is not generated by the use of oleic acid in combination.

Thus, in accordance with the present invention, a magnetic recording medium having improved electromagnetic properties and running durability where an initial reproduced output is high, a decrease of output

TABLE 1

| Sample No. | Stearic acid C$_{17}$H$_{35}$COOH | Behenic acid C$_{21}$H$_{43}$COOH wt % per total weight of three fatty acids | Oleic acid C$_{17}$H$_{35}$COOH | Average length in long axis of ferromagnetic alloy particles (μm) | Initial output (dB) | Reproduced output after 10 passes (dB) | μ values after 10 passes running | Occurence of guide stain |
|---|---|---|---|---|---|---|---|---|
| 1 (Invention) | 25 | 50 | 25 | 0.2 | +5 | +5 | 0.24 | none |
| 2 (Comparison) | 55 | 25 | 20 | 0.2 | +5 | +2 | 0.26 | none |
| 3 (Comparison) | 20 | 25 | 55 | 0.2 | +2 | 0 | 0.40 | none |
| 4 (Comparison) | 10 | 80 | 10 | 0.2 | +5 | +5 | 0.40 | none |
| 5 (Comparison) | 25 | 50 | 25 | 0.3 | 0 | 0 | 0.38 | none |
| 6 (Comparison) | 50 | — | 50 | 0.2 | −1 | −3 | 0.30 | none |
| 7 (Comparison) | — | 50 | 50 | 0.2 | +2 | 0 | 0.42 | none |
| 8 (Comparison) | 50 | 50 | — | 0.2 | +2 | 0 | 0.30 | presence | after running for 10 passes is not observed and guide stain hardly occurs can be obtained.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having coated thereon a magnetic layer, the magnetic layer containing (i) ferromagnetic alloy particles having an average length in the long axis of 0.25 μm or less and (ii) fatty acid components comprising behenic acid in an amount of 20 to 75 wt %, stearic acid in an amount of 10 to 45 wt % and oleic acid in an amount of 10 to 45 wt % based on the total weight of the three fatty acids, wherein the ferromagnetic alloy particles having a specific surface area of 45 m²/g or more.

2. The magnetic recording medium as claimed in claim 1, wherein the ferromagnetic alloy particles have an axis ratio of 7/1 or more.

3. The magnetic recording medium as claimed in claim 1, wherein the ferromagnetic alloy particles have 75 wt % or more of metal content based on the total weight of the ferromagnetic alloy particles.

4. The magnetic recording medium as claimed in claim 1, wherein the magnetic layer contains an additional lubricant, and the total amount of stearic acid, oleic acid and behenic acid is 20 wt % or more based on the total weight of the additional lubricant.

5. The magnetic recording medium as claimed in claim 1, wherein the magnetic layer further contains an abrasive agent.

6. The magnetic recording medium as claimed in claim 5, wherein the the average particle size of the abrasive agent is 0.2 to 0.8 μm.

7.) The magnetic recording medium as claimed in claim 5, wherein the amount of the abrasive agent is 15 wt % or less based on on the total weight of the ferromagnetic alloy particles.

8.) The magnetic recording medium as claimed in claim 1, wherein the ferromagnetic alloy particles have an average length in the long axis of 0.20 μm or less.

9. The magnetic recording medium as claimed in claim 1, wherein the magnetic layer contains fatty acid components comprising behenic acid in an amount of 25 to 65 wt %, stearic acid in an amount of 10 to 40 wt %, and oleic acid in an amount of 10 to 40 wt %, based on the total weight of the three fatty acids.

* * * * *